May 1, 1962

R. NOACK ETAL 3,031,939

PHOTOGRAPHIC CAMERA

Filed June 20, 1960

3 Sheets-Sheet 1

Inventors
ROLF NOACK
WERNER HAHN
By Irwin S. Thompson
Attorney

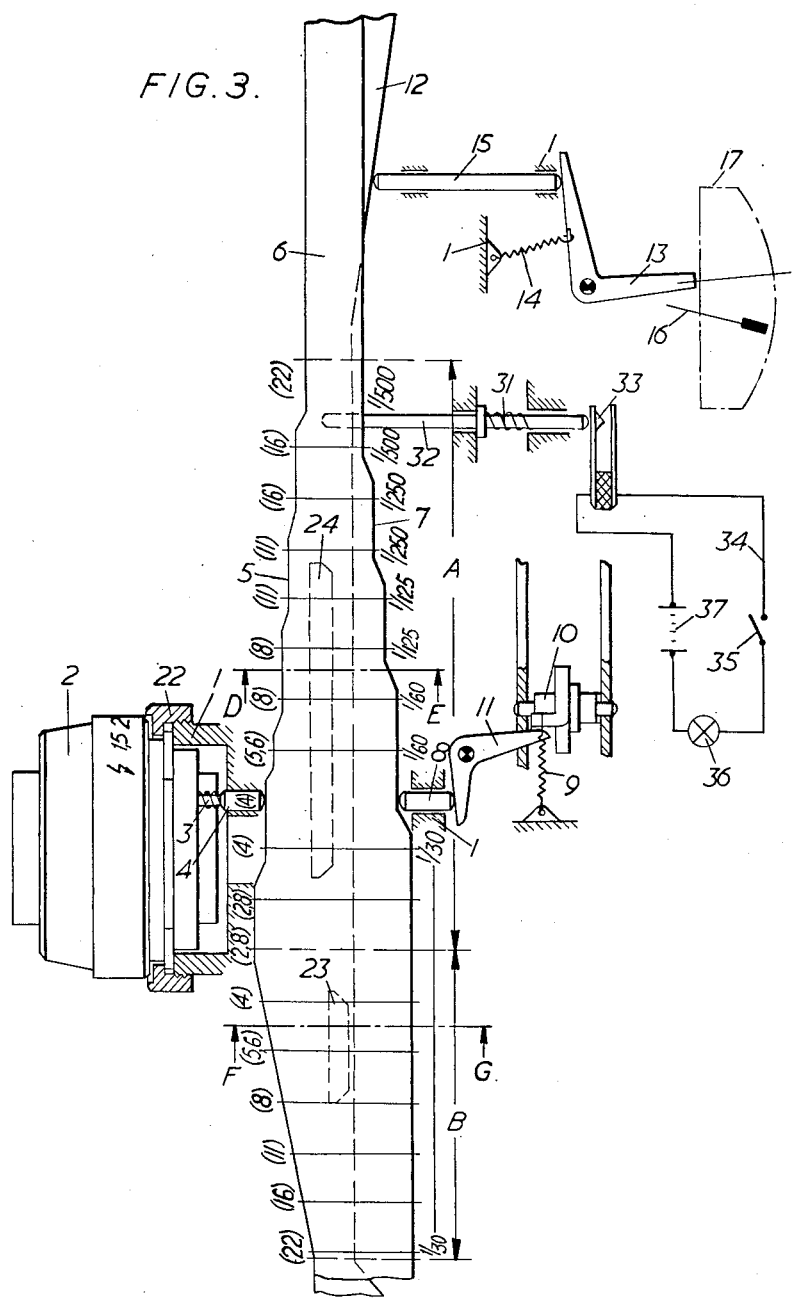

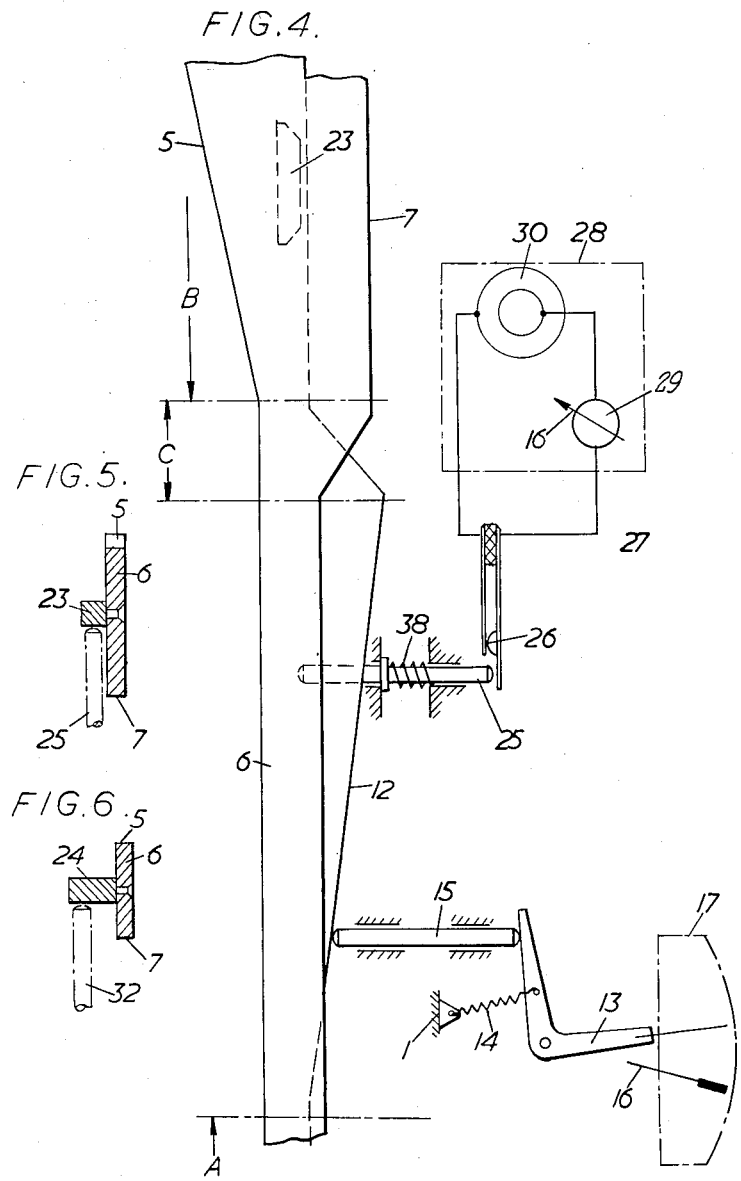

United States Patent Office 3,031,939
Patented May 1, 1962

3,031,939
PHOTOGRAPHIC CAMERA
Rolf Noack and Werner Hahn, Dresden, Germany, assignors to VEB Kamera- und Kinowerke Dresden, Dresden, Germany
Filed June 20, 1960, Ser. No. 37,123
3 Claims. (Cl. 95—10)

The present invention relates to a photographic camera with a common setting ring for the exposure factors diaphragm and exposure time (pre-set control arrangement), and a photo-electric exposure meter and a lighting device for flash lamps.

Known cameras of this nature possess special mechanisms which permit shutting off of the pre-set control arrangement, if exposures are to be carried out by means of flashlight. This requires additional expense, which makes the cameras more expensive. Furthermore, in the setting of the camera these mechanisms must be operated additionally. In order to avoid these shut-off mechanisms it has already been proposed to associate with the common setting ring a distance auxiliary scale, so that the entire setting path of the setting ring is divided into a control range provided for flash exposures and a control range provided for daylight exposures. It is here disadvantageous that flashlights which may be attached are also lit in the control range intended for daylight exposures. It is further disadvantageous that in the case of setting rings adjustable beyond one full revolution a brief coincidence of follow-up pointer and instrument pointer can take place in the rearward transition from one control range to the other, although the pre-set control arrangement is not then effective.

It is the task of the invention to avoid the above disadvantages and to preclude undesired lighting of flash lamps and erroneous exposures.

In accordance with the invention this is achieved due to the fact that the setting ring possesses at least one control dog, with which switches arranged both in the current circuit of the exposure meter and in that of the lighting device are actuated. In this manner thus in the execution of daylight exposures the lighting current circuit for the flashlights is interrupted and in the reverse transition from one control range to the other the instrument pointer is temporarily pivoted out of the window of the exposure meter, when in this setting range of the setting ring not covered by the pre-set control arrangement the follow-up pointer is pivoted through the window of the exposure meter. The details of the invention may be seen from an example of embodiment represented and described hereinafter.

Figure 1:
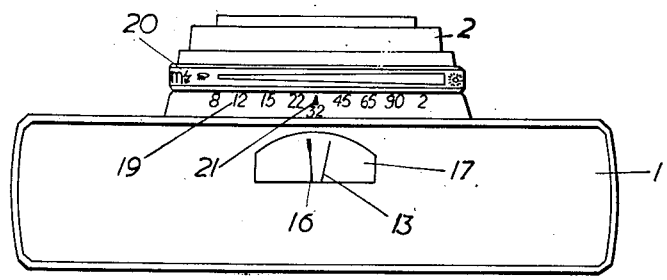
Figure 2:
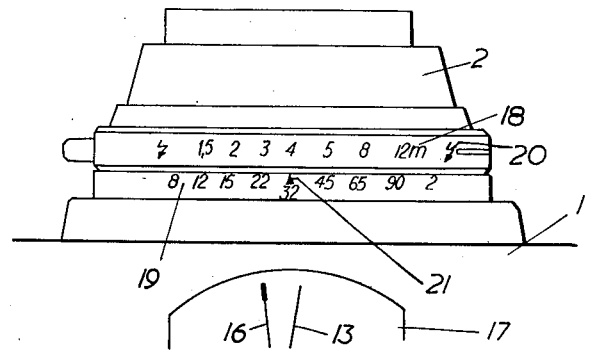

FIGURE 1 shows the overall view of a camera;
FIGURE 2 shows the arrangement of the distance auxiliary scale on the setting ring;
FIGURE 3 shows the control device with a part of the developed setting ring;
FIGURE 4 shows a further piece of the developed setting ring;
FIGURE 5 shows the section along the line FG; and
FIGURE 6 shows the section along the line DE.

The camera 1 (see FIGURE 1) carries on its front an interchangeable objective lens 2 (see FIGURES 1 and 2), which possesses a built-in diaphragm. A spring 3 (see FIGURE 3) seeks to draw the diaphragm to its smallest aperture and to press the push-rod 4 against the control cam 5 of the setting ring 6. The setting ring 6 also possesses a control cam 7. As a result of the spring 9 the push-rod 8 places itself against this control cam 7, the spring 9 being secured to the exposure time mechanism 10 and a bell-crank lever 11 being arranged between the said exposure time mechanism 10 and the push-rod 8. As a result of the spring 14 secured to the follow-up pointer 13 the push-rod 15 places itself against a further control cam 12 of the setting ring 6. The follow-up pointer 13 is visible together with the instrument pointer 16 of an exposure meter (not separately illustrated) in a window 17.

The setting ring 6 is provided with the distance auxiliary scale 18, opposite which there is arranged rigid with the housing a flash guide number scale 19. Two marks 20 on both sides of the distance auxiliary scale 18 indicate on reaching the counter-mark 21 fast with the housing, when the setting range of the setting ring 6 intended for flash exposures is reached or passed.

In order that both daylight exposures and flash exposures may be effected with the setting ring 6 without the actuation of special change-over members, the control cams 5 and 7 of the setting ring 6 are divided into two control ranges A and B. In the control range A the control cams 5 and 7 alternately shift the diaphragm and the exposure time mechanism, while in the control range B, with maintenance of an exposure time (for example 1/30 sec.) suitable for flash exposures, only the diaphragm is shifted. In this control range B the above-mentioned distance auxiliary scale 18 is effective. Furthermore, in this control range B the control cam 12 moves back so far that the follow-up pointer 13 is pivoted out of the window 17.

(1) The control ring 6 carries two control dogs 23 and 24. In the path of the control dog 23 there lies the operating pin 25 subject to the action of the spring 38 and cooperating with the switch 26. This switch 26 is arranged in the current circuit 27 of the exposure meter 28, the galvanometer 29 of which is influenced by the photo-electric cell 30. In the path of the control dog 24 there lies, under the action of the spring 31, the operating pin 32 which cooperates with the switch 33. The switch 33 lies in the current circuit 34 of an ignition switch 35, controlled on the shutter side, of known construction, for flashlights 36. A current source 37 delivers the lighting current.

(2) The control ring 6 is adjustable beyond one full revolution. This produces a setting range C, in which the control cams 5 and 12 possess no controlling action in the sense of the pre-set programme control, but merely, through the push-rods 8 and 15, transfer the exposure time mechanism 10 and the follow-up pointer 13 from one end position to the other. The follow-up pointer 13 here comes into the window 17, so that coincidence between the said follow-up pointer 13 and the instrument pointer 16 becomes possible, which gives the appearance of a setting suitable for proper exposures. In order in this setting range C to make coincidence impossible, in the setting range C of the setting ring 6 the switch 26 is actuated and the photo-electric cell 30 is switched off. The instrument pointer 16 thus comes temporarily out of the window 17. Only when the setting range C has been turned past the push-rod 15 does the photo-electric cell 30 again influence the galvanometer 29 and the instrument pointer 16 again comes into the window 17. The switch 26 could naturally also be arranged in parallel with the galvanometer 29 and in the setting range C could short-circuit the photo-electric cell.

If daylight exposures are effected, the control of diaphragm and exposure time takes place through the control range A. Flashlights 36 which might be attached should not be lit in this case. Therefore, the control dog 24, the length of which corresponds to the control range B intended for flash exposures, abuts at the commencement of the control range B against the operating pin 32 and presses the latter against the spring 31. Thus the switch 33 is closed and the lighting current circuit 34 is set into readiness for working, that is to say an instigated shutter running-off is in a position to actuate the shutter-controlled lighting switch 35, so that the lighting current circuit is closed. On leaving the control range B the operating pin 32 comes out of the range of effect of the control dog 24, so that the spring 31 can open the lighting current circuit 34 by actuation of the switch 33. A shutter release for the purpose of the execution of an exposure, wherein the lighting switch 35 is actuated synchronously with the running-off of the shutter, therefore does not cause lighting of the flash lamp 36.

The manner of operation of the new device is as follows:

By tightening of the bayonet ring 22 the objective lens 2 desired in each case is connected firmly with the camera 1. Here the diaphragm aperture corresponding to the momentary position of the setting ring 6 is automatically set by pressing in of the push-rod 4 against the spring 3.

If daylight exposures are to be carried out, then the setting ring 6 is rotated until the follow-up pointer 13 lies over the instrument pointer 16. In this rotation the diaphragm on the objective side has shifted itself over the control cam 5 and the exposure time mechanism 10 on the shutter side has shifted itself over the control cam 7, according to the measure of the programme imparted to the setting ring 6 through the control cams 5 and 7.

In the case of flash exposures merely by rotation of the setting ring 6, by means of the distance auxiliary scale 18, the value of the distance between flash lamp and the object of which a picture is to be taken is placed opposite the flash guide number of the flash lamp used, on the flash guide member scale 19. Without the exposure time here changing, the correct diaphragm value is automatically produced. It must only be observed that the counter-mark 21 does not come out of the control range B indicated by the marks 20. Should this be the case with the flash lamp selected and the distance set, a proper exposure is not possible. Only by variation of the distance or by selection of a different flash lamp can an exposure be carried out.

We claim:

1. In a photographic camera, having a casing, a window in the casing, a shutter device mounted on the casing, an adjustable aperture diaphragm in the shutter device, an exposure time adjusting mechanism coupled to the shutter device, an exposure meter having a moving-coil, a meter pointer connected to said moving coil, and normally visible in the window, and a flashlighting device, including a first switch means operated by the shutter device, the provision of a rotatable setting ring having first and second regions of rotation, two control cams connected to the setting ring, adapted for controling the aperture diaphragm and the exposure time adjusting mechanism respectively, each control cam having a first control range and a second control range corresponding to the two setting ring rotational regions respectively, two push-rods coacting with the control cams and operably coupled to the aperture diaphragm and the exposure time adjusting mechanism respectively, a follow-up pointer coupled to the setting ring, the first ranges on the control cams being such that in the first rotational region of the setting ring the diaphragm aperture and the exposure time are adjustable by the setting ring, whereby the follow-up pointer may be made to coincide with the meter pointer to indicate readiness for picture-taking, and the second ranges on the control cams being such that in the second rotational region of the setting ring the diaphragm aperture and the exposure time are adjustable as required for flashlight picture-taking, second switch means arranged in the flashlighting device circuit in series with the first switch means, and a projection provided on said setting ring for opening said second switch means during rotation of said setting ring through said first rotational region, and to close the second switch means during rotation of said setting ring through said second rotational region.

2. In a photographic camera having a casing, a window in the casing, a shutter device mounted on the casing, an adjustable aperture diaphragm in the shutter device, an exposure meter having an exposure meter circuit and a moving-coil, a meter pointer connected to said moving coil, and normally visible in the window, the provision of a rotatable setting ring having first, second and third regions of rotation, two control cams connected to the setting ring, adapted for controlling the aperture diaphragm and the exposure time adjusting mechanism respectively, each control cam having first, second and third control ranges corresponding to the three setting ring rotational regions respectively, two push-rods co-acting with the control cams and operably coupled to the aperture diaphragm and the exposure time adjusting mechanism respectively, a follow-up pointer coupled to the setting ring, the first ranges on the control cams being such that in the first rotational region of the setting ring the diaphragm aperture and the exposure time are adjustable by the setting ring, whereby the follow-up pointer may be made to coincide with the meter pointer to indicate readiness for picture-taking, the second ranges on the control cams being such that in the second rotational region of the setting ring the diaphragm aperture and the exposure time are adjustable as required for flashlight picture-taking, the third ranges on the control cams being such that on rotation of the setting ring the push-rods are moved from one end position to the other, switch means in the exposure meter circuit, and a projection provided on said setting ring for co-operating with said switch means to open the circuit through the exposure meter during rotation of said setting ring through said third rotational region.

3. A photographic camera according to claim 1, wherein the follow-up pointer is coupled to the setting ring by means of a further push-rod which engages a further control cam carried by the setting ring, which further control cam is shaped so as to move the follow-up pointer out of alignment with the window during rotation of said setting ring through the second rotational region.

References Cited in the file of this patent

UNITED STATES PATENTS

| | | |
|---|---|---|
| 2,887,026 | Rentschler | May 19, 1959 |
| 2,913,969 | Faulhaber | Nov. 24, 1959 |
| 2,926,571 | Sommer | Mar. 1, 1960 |
| 2,943,545 | Fahlenberg | July 5, 1960 |
| 2,953,978 | Rentschler | Sept. 27, 1960 |